United States Patent Office 3,228,906
Patented Jan. 11, 1966

3,228,906
PROCESS FOR THE PRODUCTION OF CONCENTRATED, LOW-VISCOSITY SYNTHETIC RUBBER DISPERIONS
Herbert Schluter and Paul Kranzlein, both of Marl, Kreis Recklinghausen, Germany, assignors to Chemische Werke Huls Aktiengesellschaft, Marl, Kreis Recklinghausen, Germany, a corporation of Germany
No Drawing. Filed Dec. 7, 1961, Ser. No. 157,853
Claims priority, application Germany, Feb. 16, 1961, C 23,421
2 Claims. (Cl. 260—29.7)

In the production of synthetic rubber water dispersions of relatively low solids content generally are produced. Since the latex particles in such dispersions are mostly very small and the density difference between the synthetic rubber particles and the aqueous phase is small the dispersions can be concentrated by vaporization or "creamed up" to only a relatively low solids content. However, for many technical purposes dispersions having a high solids content are required.

It is known that by adding the emulsifier stepwise or portionwise during the polymerization relatively large particles of the polymerizate and a relatively high solids content in the dispersion may be obtained. But this and similar processes have the disadvantage that the polymerization proceeds substantially more slowly. Other processes for the production of concentrated dispersions involve causing the latex particles to grow in size after the polymerization, e.g. the freezing-agglomeration method. This method, however, requires both a large amount of energy for refrigeration and also a careful control of the emulsifier content.

It is also known to concentrate dispersions by the addition of electrolytes and organic solvents. Further, it is known that by the addition of suitable substances having molecular weights within certain limits such as polyvinylmethylether, polyethylene-polyamine and polyvinylalcohol concentrated dispersions can be obtained. These substances are, however, either difficult to obtain or give dispersions of high solids content only when used in combination with high electrolyte and/or dispersing agent additions in the presence of organic solvents or of residual monomer after the polymerization or by alteration of the pH value.

It has now been found that a low viscosity aqueous synthetic rubber dispersion having a high solids content can be made advantageously by evaporation concentration of the dispersion in the presence of a substance which causes growth of the particles and if desired also an electrolyte or an organic solvent provided that the particle size growth promoting substance used is or includes a polyalkylene oxide having a molecular weight of from 3,000 to 30,000 used in quantity within the range from 0.01 to 2% based upon the weight of the solids content of the dispersion.

Suitable synthetic rubber dispersions are obtainable by the emulsion polymerization of diolefines such as butadiene and substituted butadienes such as isoprene and chlorobutadiene or mixtures of these diolefines with vinyl compounds such as styrene, acrylonitrile, acrylamide or vinylpyridine. The process of the present invention is applicable also for the concentration of dispersions of mixed polymerizates of butadiene with a higher proportion of styrene. The dispersions may contain as the emulsifiers or dispersing agents ionic compounds such as alkali metal salts of fatty acids, disproportionated resin acids, alkyl and aralkyl sulfonic acids or the non-ionic compounds formed by the addition of ethylene oxide to alcohols which in general have molecular weights within the range from 400 to 2,000.

Suitable particle size growth promoting polyalkylene oxides are for example the polymeric ethylene oxide and propylene oxide as well as their mixed polymerizates and derivatives. The molecular weight of these polyalkylene oxides may be within the range from 3,000 to 30,000 and preferably within the range from 10,000 to 15,000. The molecular weight may be ascertained by the end-group determination (OH number) method of M. Freed and A. M. Wynne (Zeitschrift für Analytische Chemie, 117, page 424, 1939). These polyalkylene oxides may be used alone or in combination with small amounts of electrolytes and/or organic solvents. Suitable electrolytes are the alkali metal and ammonium salts of carbonic acid, formic acid, acetic acid, sulfuric acid, nitric acid, phosphoric acid and hydrochloric acid, e.g. ammonium bicarbonate, methyl-ammonium carbonate, dimethyl-ammonium carbonate, sodium sulphate, potassium sulfate, sodium nitrate and trisodium phosphate. Suitable organic solvents are hydrocarbons such as heptane, hexane, pentane, petroleum ether, benzine, cyclohexane and chlorohydrocarbons.

Aqueous rubber dispersions having solids contents within the range from 20 to 50% are used. To these dispersions are added the above-mentioned polyalkylene oxides as aqueous solutions, either alone or if desired in combination with small amounts of electrolytes and a condensation product of formaldehyde and naphthalene sulfonic acid. The dispersions are then evaporated with stirring under vacuum at temperatures within the range from 0 to 100° C. and preferably within the range from 40 to 60° C. to a solids content within the range from 55 to 72% without loss of the fluidity required for their further working. The latex particles grow during the evaporation while at the same time the surface tension decreases about 10 to 25 units. The particle size growth occurs during the concentration through the solids content range from about 35 to 70% and especially from 45 to 60% and amounts to about 500 to 10,000 A. (average weight) and 200 to 2,000 A. (average number). The dispersions so produced can be used for the production of foam products, for impregnation purposes and as coating and adhesive materials.

EXAMPLE 1

A synthetic rubber dispersion having a solids content of 23% was produced by the polymerization of 72 parts by weight of butadiene and 28 parts by weight of styrene in the presence of a mixed emulsifier consisting of 3 parts by weight of disproportionated resin soap, 1.1 parts by weight of potassium stearate, 0.75 part by weight of potassium oleate, 0.14 part by weight of tripotassium phosphate and 0.3 part by weight of potassium chloride to 60% conversion. The diameter of the latex particles is 520 A. (average weight) and 500 A. (average number). 0.11 part by weight of potassium sulphate, 0.11 part by weight of a condensation product of formaldehyde and naphthalene sulfonic acid and 0.11 part by weight of a polyethylene oxide having a molecular weight of 12,000 made by the polyaddition of ethylene oxide at 160–180° C. in the presence of about 0.2% of NaOH were added to the dispersion and it was concentrated by evaporation at 50 to 60° C. under vacuum. In this way the values (1) given in Table 1 were obtained. The values (2) of Table 1 are for a similar dispersion which was concentrated without the addition of the polyalkylene oxide.

*Table 1*

| Solids content, percent | Viscosity, cp. | Particle diameter | |
|---|---|---|---|
| | | Average weight, A | Average number, A |
| (1) 66.8 | 1,540 | 8,000 | 1,880 |
| (2) 44.4 | 1,500 | 520 | 500 |

EXAMPLE 2

A synthetic rubber dispersion having a solids content of 23% was made by Redox polymerization at 5° C. of 69 parts by weight of butadiene and 31 parts by weight of styrene in the presence of 2 parts by weight of potassium oleate, 0.14 part by weight of tripotassium phosphate and 0.3 part by weight of potassium chloride to a conversion of 60%. The diameter of the latex particles amounted to 540 A. (average weight) and 510 A. (average number). The dispersion was concentrated by evaporation under vacuum at 50–60° C. with the addition of 0.075 part by weight of potassium sulfate, 0.11 part by weight of a condensation product of formaldehyde and naphthalene sulfonic acid and 0.08 part by weight of polyethylene oxide having a molecular weight of 12,000. Thus were obtained the value (1) of Table 2. The values (2) of Table 2 are for a similar dispersion which was concentrated without the addition of polyethylene oxide.

*Table 2*

| Solids content, percent | Viscosity, cp. | Particle diameter | |
|---|---|---|---|
| | | Average weight, A | Average number, A |
| (1) 70.3 | 1,000 | 10,000 | 2,300 |
| (2) 46.3 | 1,500 | 540 | 510 |

EXAMPLE 3

A synthetic rubber dispersion having a solids content of 24% was made by Redox polymerization at 5° C. of 69 parts by weight of butadiene and 31 parts by weight of styrene in the presence of 1.65 parts by weight of potassium oleate, 0.85 part by weight of tetrapropylene benzene sulfonate, 0.14 part by weight of tripotassium phosphate and 0.3 part by weight of potassium chloride to a conversion of 65%. The diameter of the latex particles amounted to 500 A. (average weight) and 480 A. (average number). The dispersion was concentrated by evaporation under vacuum at 50° C. with the addition of 0.11 part by weight of potassium sulfate, 0.11 part by weight of a condensation product of formaldehyde and naphthalene sulfonic acid and 0.12 part by weight of polyethylene oxide having a molecular weight of 12,000. Thus were obtained the values (1) of Table 3. The values (2) of Table 3 correspond to a dispersion which was concentrated without the addition of the polyethylene oxide.

*Table 3*

| Solids content, percent | Viscosity, cp. | Particle diameter | |
|---|---|---|---|
| | | Average weight, A | Average number, A |
| (1) 71.1 | 1,256 | 9,500 | 2,400 |
| (2) 47.5 | 1,200 | 700 | 620 |

We claim:
1. Process for the production of a low-viscosity aqueous synthetic rubber dispersion having a solids content of from 55 to 72% by weight which comprises adding from 0.01 to 2% by weight based upon the weight of said solids of a polyethylene oxide having a molecular weight of from 3,000 to 30,000 to an aqueous dispersion of synthetic rubber having solids content of from 20 to 50% by weight and concentrating the dispersion by evaporation under vacuum to a solids content of from 55 to 72% by weight.

2. Process as defined in claim 1 in which an alkali metal salt is added to the dispersion prior to the concentration thereof.

References Cited by the Examiner
UNITED STATES PATENTS
2,424,648 7/1947 Bixby _____ 250—29.7
2,791,567 5/1957 Lowe et al. _____ 260—29.7

FOREIGN PATENTS
794,837 5/1958 Great Britain.

OTHER REFERENCES
Perry: "Chemical Engineer's Handbook" (1950), McGraw-Hill Book Company, Inc., New York, page 864.

MURRAY TILLMAN, *Primary Examiner.*

LEON J. BERCOVITZ, *Examiner.*